United States Patent Office 3,703,451
Patented Nov. 21, 1972

3,703,451
SOLVENT EXTRACTION AND ELECTROWINNING OF COPPER
Thomas Victor Healy, Abingdon, and Alan Pilbeam, Didcot, England, assignors to United Kingdom Atomic Energy Authority, London, England
No Drawing. Filed Sept. 13, 1971, Ser. No. 180,140
Claims priority, application Great Britain, Sept. 18, 1970, 44,582/70
Int. Cl. C22d 1/16; C22b 3/00, 15/00
U.S. Cl. 204—106
9 Claims

ABSTRACT OF THE DISCLOSURE

Copper is extracted from dilute aqueous solution by adding excess chloride, reducing dissolved copper from the cupric to the cuprous state, e.g. using sulphur dioxide, and performing a solvent extraction operation using a solution, in an inert water-immiscible liquid, of a tri-(alkyl or aryl)phosphite as an extractant. The copper may be recovered by backwashing the water-immiscible phase with aqueous ammonia, and then depositing the metal by electrolysis.

---

This invention relates to the solvent extraction of copper from aqueous solutions thereof, and provides a process which is characterised by the use of a novel extractant. A major potential use of the present invention is in the separation of copper dumped from low copper-bearing ores. These are normally excavated during open-cast working prior to mining the richer ores deeper down. The dumps are at present leached commercially, for example with dilute sulphuric acid, to give a dilute copper solution (of the order of 0.5 to 10 gm. of copper per litre) which contains appreciable quantities of iron and small quantities of other metals as impurities.

The invention provides a method of extracting copper by solvent extraction from an aqueous solution thereof in which the copper is in the cuprous state and the halide ion concentration is at least 0.1 M, which method comprises contacting the aqueous solution with a solution, in an inert water-immiscible liquid, of a tri-(alkyl or aryl)phosphite so as to extract copper into the non-aqueous phase.

Generally, the starting material will be a dilute solution (containing e.g. from 0.5 to 10 g. of copper per litre) of copper sulphate, containing also iron and other metals.

This solution is first pre-treated to raise the halide ion concentration, preferably to a value of at least 1 M. Chlorides are the preferred halides, but bromides may be used if the increased cost involved is acceptable. We prefer to raise the chloride ion concentration of the solution by adding solid sodium chloride or calcium chloride, though other chlorides can be used, albeit at greater expense. If calcium chloride is used, calcium sulphate precipitates out; the precipitate is not harmful to the extraction, but can readily be removed by filtration if this is desired. Alternatively, hydrochloric acid may be used as the source of halide ions.

The solution is then pre-treated to reduce dissolved copper from the cupric to the cuprous state. This may be done by any known reductant, for example, hydrazine or hydroxylamine. We prefer to do the reduction by passing sulphur dioxide through the solution, e.g. so as to saturate the solution.

If the halide ion concentration of the aqueous solution is less than 0.1 M, relatively poor extraction of copper is achieved per equal volume of extractant. While halide ion concentrations of 5 M or 6 M or more may be used, there may be little or no advantage in using such concentrations, and the cost of the halide may be an appreciable factor. We prefer to use halide ion concentrations of from 1 M to 3 M, although concentrations of 0.1 M to 1 M can be used.

The aqueous solution should not be alkaline. The pH of the aqueous solution may vary widely, but is preferably up to 0 to 7, particularly up to 6.

The extractant is a tri-(alkyl or aryl)phosphite. By this we mean a compound having the formula $(RO)_3P$, where the three groups R in any one molecule may be the same or different from one another; and may represent alkyl, preferably having from 2 to 12, e.g. 6 to 12 carbon atoms, e.g. n-butyl or 2-ethylhexyl; or aryl, e.g. phenyl, or substituted aryl, e.g. 2-methylphenyl. Suitable compounds within this class include tri-n-butyl phosphite and triphenyl phosphite. We prefer to use di-2-ethyl-hexyl-phenyl phosphite.

The extractant may be used in solution in any of a wide range of inert water-immiscible organic liquids. Examples are benzene, xylene, ethylbenzene, diethylbenzene, and kerosene. We prefer to use kerosene. The solution may contain from 1% w./v. of the extractant up to a maximum set by its solubility in the organic liquid; we prefer to use solutions containing from 5% to 30% w./v. of the extractant.

It is generally preferable to use from 0.5 to 2.0, e.g. about 1.0, volumes of the extractant solution per volume of aqueous solution.

The number of moles of extractant should normally be between one and three times the number of moles of copper to be extracted, and may be more if desired. It is believed that the extraction properties of these phosphites arises from their ability to form complexes with the copper, for example $CuCl.(RO)_3P$ and

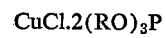

$$CuCl.2(RO)_3P$$

The extraction may be effected, either continuously or on a batch basis, by any conventional means for example by the use of a multistage countercurrent system. The extractant is protected from acid chemical attack by formation of its copper chloride complex, and no great excess of extractant is normally present during copper extraction from acid solutions.

The copper may be recovered from the non-aqueous phase by back-washing. For this purpose, we prefer to use an aqueous solution of ammonia, e.g. 0.5 to 2.0, volumes per volume of non-aqueous phase, suitably in a 0.5 to 1.0 M concentration. The excess ammonia can be removed, e.g. by blowing with air, to leave an aqueous solution of a complex or cuprous chloride and ammonia, from which copper can be recovered electrolytically. In place of ammonia, there may be used a substituted ammonia, e.g. an amine, for example, diethylamine, or thiourea.

Alternatively, the copper may be recovered from the non-aqueous phase by back-washing with an aqueous solution of hydrogen sulphide or of a metal sulphide. In this case, the copper is precipitated as copper sulphide, and the use of sulphide is not suitable for a continuous solvent extraction process.

The halide ion content of the treated aqueous solution is preferably recycled and re-used, either by recycling the aqueous solution as a whole, or by evaporating this aqueous solution and recovering the salt. Furthermore, ammonia used for the back-washing is preferably recovered for re-use. The solvent may also be re-used. After several cycles it can be washed, with advantage, with dilute alkali, for example sodium carbonate, or dilute acid, for example, sulphuric acid, and then recycled.

The invention can be used to extract at least 99 w./o. of the copper from an aqueous acid sulphate solution containing copper, iron and other metals generally associated with copper, while leaving at least 99 w./o. of the iron and at least 95 w./o. of the other metals in the aqueous phase.

Two examples are given for extracting copper from aqueous solutions, one containing sulphuric acid and the other hydrochloric acid. In the first example of copper extraction, solutions containing simulated typical copper dump leach liquors are extracted.

EXAMPLE I

To a synthetic mixture containing 0.1 molar sulphuric acid ($H_2SO_4$), 0.1 molar copper, 0.1 molar iron, 0.01 molar nickel, 0.01 molar cobalt and 0.005 molar zinc all as sulphate, was added enough solid sodium chloride to make the solution 1 molar in chloride ion. The solution was saturated with sulphur dioxide gas and the copper was extracted by adding ½ volume of 15% w./w. di-2-ethylhexylphenyl phosphite in kerosene. This yielded 99% of the copper in the organic extractant and left 99.9% of the iron, nickel, cobalt and zinc in the aqueous solution. The nonaqueous solution containing the copper was air sparged to remove excess sulphur dioxide ($SO_2$) gas and the copper was back-extracted with 2 volumes of 0.8 molar aqueous ammonia solution per volume of non-aqueous phase. This removed 99.9% of the copper into the aqueous phase. After blowing air through the solution to recover the ammonia, copper was removed electrolytically from the aqueous solution of the copper chloride-ammonia complex.

EXAMPLE II

A solution containing 1 molar hydrochloric acid, 0.1 molar copper, 0.1 molar iron, 0.01 molar zinc, 0.01 molar cobalt, 0.01 molar nickel all as sulphate and 0.5 molar sodium chloride was saturated with sulphur dioxide gas. The copper was extracted by 2 volumes of 7% triphenyl phosphite in diethyl-benzene. This gave 99% of the copper in the organic phase and left 99% of the iron, cobalt, nickel and zinc in the aqueous phase. After air sparging the organic phase to remove sulphur dioxide, 2 volumes of 0.8 M aqueous ammonia solution was added per volume of the non-aqueous phase. This removed 99% of the copper into the aqueous phase. Air sparging removed excess ammonia gas and the copper was recovered electrolytically from the aqueous solution of the copper chloride-ammonia complex.

We claim:
1. A method of extracting copper by solvent extraction from an aqueous solution thereof in which the copper is in the cuprous state and halide ion concentration is at least 0.1 M, which method comprises contacting the aqueous solution with a solution, in an inert water-immiscible liquid, of a tri-(alkyl or aryl)phosphite so as to extract copper into the non-aqueous phase.

2. A method as claimed in claim 1 wherein the halide ion concentration has been brought to the desired value by adding sodium chloride or calcium chloride to the aqueous solution.

3. A method as claimed in claim 1, wherein dissolved copper has been reduced to the cuprous state by saturating the aqueous solution with sulphur dioxide.

4. A method as claimed in claim 1, wherein the pH of the solution is not greater than 6.

5. A method as claimed in claim 1, wherein the tri-(alkyl or aryl)phosphite has the formula $(RO)_3P$, where the three groups R in the molecule may be the same as or different from one another and each represents an alkyl group containing from 2 to 12 carbon atoms or a phenyl group.

6. A method as claimed in claim 1, wherein the solution in the inert water-immiscible liquid contains from 5% to 30% w./v. of the tri-(alkyl or aryl)phosphite.

7. A method as claimed in claim 1, wherein the number of moles of tri-(alkyl or aryl)phosphite used is from 1 to 3 times the number of moles to be extracted.

8. A method as claimed in claim 1, wherein the copper is recovered from the non-aqueous phase by backwashing with aqueous ammonia.

9. A method as claimed in claim 8, wherein the copper is recovered electrolytically from the aqueous ammonia.

References Cited
UNITED STATES PATENTS
3,104,971   9/1963   Olson et al. _____ 75—117

JOHN H. MACK, Primary Examiner
R. L. ANDREWS, Assistant Examiner

U.S. Cl. X.R.
75—101 BE, 117